No. 846,517. PATENTED MAR. 12, 1907.
C. SPIERLING.
BEEHIVE.
APPLICATION FILED JUNE 7, 1906.
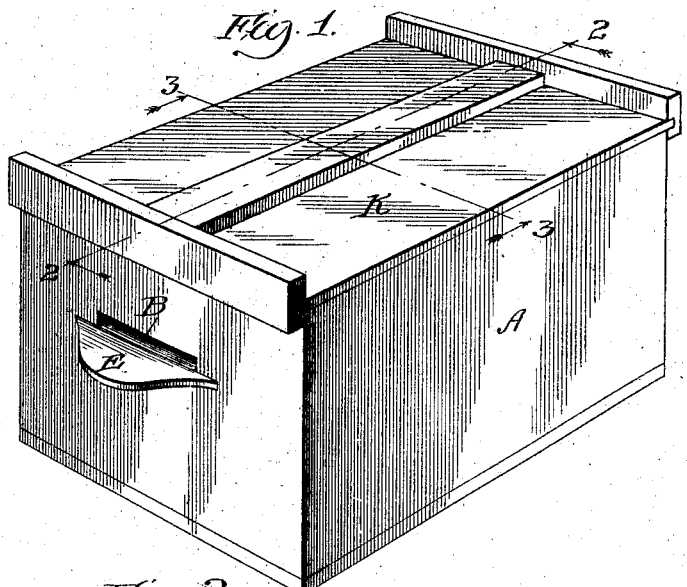
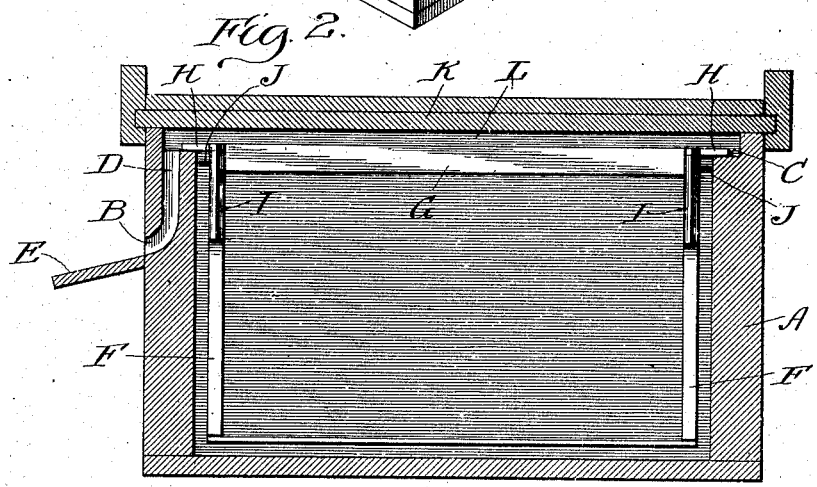
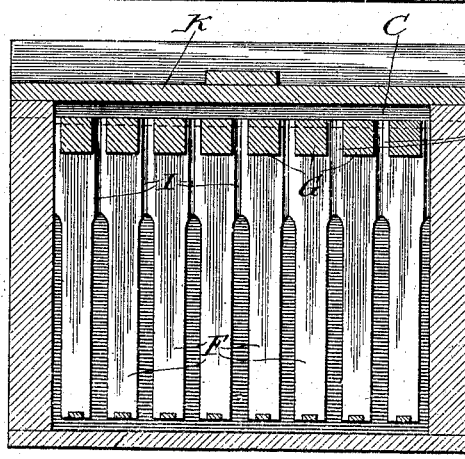
Witnesses
Ray White
M. H. Olsen
Inventor
Charles Spierling
By Gorgan & Rubinstein
Attys

UNITED STATES PATENT OFFICE.

CHARLES SPIERLING, OF DALTON STATION, ILLINOIS.

BEEHIVE.

No. 846,517.  Specification of Letters Patent.  Patented March 12, 1907.

Application filed June 7, 1906. Serial No. 320,618.

*To all whom it may concern:*

Be it known that I, CHARLES SPIERLING, a citizen of the United States, residing at Dalton Station, in the county of Cook and State of Illinois, have invented a new and useful Improvement in Beehives, of which the following is a specification.

The object of my invention is to so construct the hive as to better protect the bees in winter from the cold winds, moisture, and bad air, to prevent the entrance from being closed by snow and ice, and to enable the bees to effectually prevent the entrance into the hive of robber-bees, moths, and other insects that seek access to the honey.

The manner in which I accomplish my object is described in the following specifications and illustrated in the accompanying drawing, in which—

Figure 1 is a perspective view of the hive, showing the entrance thereto. Fig. 2 is a vertical section on the line 2 2, Fig. 1. Fig. 3 is a vertical cross-section on the line 3 3, Fig. 1.

In the drawings, A indicates the main body of the hive, which may be of any suitable material or construction, except in the matter of the entrance B in the front part of the hive. The interior part of the end parts of the hive is cut down to form a shoulder C for a purpose hereinafter described. In the front end a vertical slot D, which extends down from the shoulder C about one-third of the vertical height of the front end and curves outward through the front, as shown in Figs. 1 and 2, and forms an entrance B. Affixed to the front end of the hive in line with the entrance and at a descending angle corresponding with the bottom line of the slot D is a shelf E, adapted to form a rest and runway for the bees entering and leaving the hive. Adjustably supported on the shoulders C inside the hive are a series of frames F of the kind ordinarily used in hives and adapted to carry the honeycombs.

The top rail G of the frame is extended at H, and thereby adapted to rest on the shoulders C and hold the frame in suspension. In the end pieces I of the frame C are staples J, adapted to space the frame from the interior of the main body. Over these frames and spaced therefrom is the cover K of the hive, which may be of the ordinary kind in use or of any suitable construction.

When the hive is constructed as described and shown and the frames F inserted and cover K secured on the main body A, the bees instead of entering at the bottom of the hive in the usual way enter from the shelf E up through the slot D into the space L between the cover K and the top rail G of the frames F. From this space the bees are free to descend into the frames F through the spaces M between the frames shown in Fig. 3. The air enters the hive through the slot D into the warmest part of the hive and passes out the same way, carrying with it all the moisture due to condensation in the hive, and the movement of the bees carries a sufficient circulation to keep the air pure and the temperature equable. The location of the entrance at the top of the hive and its particular form enables the bees to gather in sufficient numbers at the top of the slot under the cover to prevent the entrance of any individual or a number of robber bees, moths, or other insetts from entering the hive.

What I claim as new, and desire to secure by Letters Patent, is—

In a beehive of the kind described, the combination with a plurality of brooding-frames adapted to be suspended by the top rails thereof, of an inclosing case, the end walls of said case being shouldered down internally for supports for said frames, a single aperture in said case, said aperture commencing externally above the middle line of the height of said case in one of said end walls, said aperture extending inward to the center of the thickness of said wall and vertically therein up to the shoulder near the top, and a lid adapted to cover the top of said case, the inside of said lid when said lid is closed on said hive being only a sufficient height above the frames in said hive as to allow the bees to crawl to and from the frames and said aperture in said case.

CHARLES SPIERLING.

Witnesses:
 JOSEPH STAAB,
 THOMAS J. MORGAN.